// United States Patent [15] 3,676,804
Mueller [45] July 11, 1972

[54] INITIALIZATION OF ADAPTIVE CONTROL SYSTEMS

[72] Inventor: Kurt Hugo Mueller, Matawan, N.J.

[73] Assignee: Bell Telephone Laboratories Incorporated, Murry Hill, Berkeley Heights, N.J.

[22] Filed: Feb. 22, 1971

[21] Appl. No.: 117,389

[52] U.S. Cl. ....................333/18, 333/70 T
[51] Int. Cl. ....................H04b 3/04
[58] Field of Search ....................333/16–18, 70 T; 330/84, 124 R

[56] References Cited

UNITED STATES PATENTS 3,414,819 12/1968 Lucky ....................333/18 X
3,553,606 1/1971 Port ....................333/18

*Primary Examiner*—Paul L. Gensler
*Attorney*—R. J. Guenther and Kenneth B. Hamlin

[57] ABSTRACT

Adaptive control systems are brought to a predetermined reference state with respect to a plurality of attenuation coefficients by taking the signal at a preselected reference location rather than the normalized overall output as the signal to be approximated. In this way the adaptive process brings all variable subsystem attenuators to base level settings and the reference attenuator to a normalized level setting in response to an arbitrary input.

8 Claims, 1 Drawing Figure

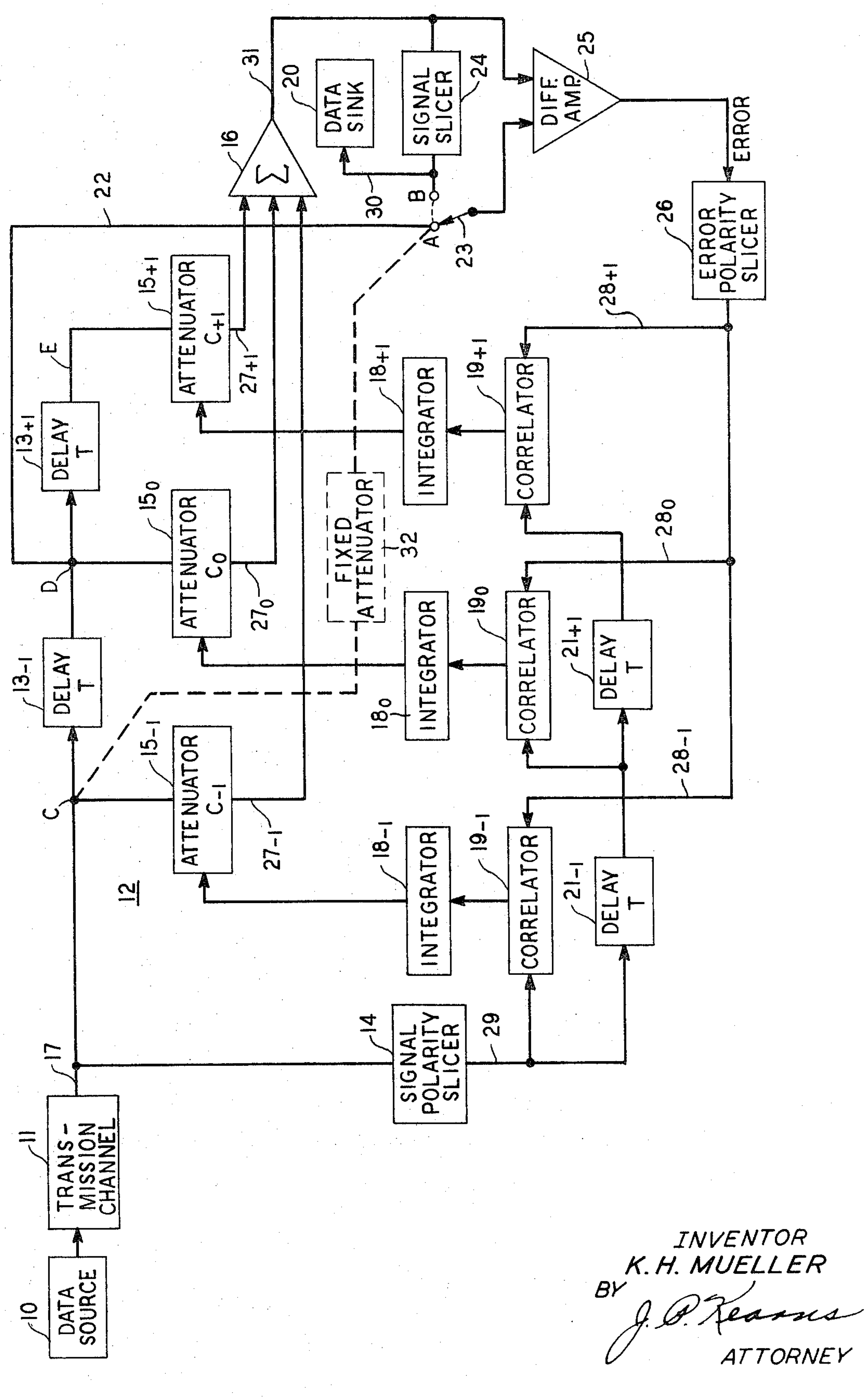
INVENTOR
K. H. MUELLER
BY J. P. Kearns
ATTORNEY

INITIALIZATION OF ADAPTIVE CONTROL SYSTEMS

FIELD OF THE INVENTION

This invention relates generally to the initial adjustment of adaptive control systems and in particular to rapid initialization into a predetermined reference state of equalizers for compensating distorting data transmission channels.

BACKGROUND OF THE INVENTION

Adaptive control systems find numerous applications in such processes as stochastic signal estimation, automatic equalization for data transmission systems and adaptive echo cancellation in telephone networks. These systems generally comprise a number of parallel subsystems distinguished by variable signal shaping characteristics and having a common input and output or are represented by a transversal structure for combining selectively attenuated time-spaced samples of a given input signal appearing at the several taps thereon. The contribution of each subsystem to the total response of the overall system is subject to adaptive control over certain ranges.

The automatic transversal time-domain equalizer is an important example of an adaptive control system which is used extensively for data transmission over voice-grade telephone lines to compensate for delay as well as amplitude distortion and thereby to facilitate the transmission of digital data at relatively high speeds. In the transversal equalizer a plurality of synchronously time-spaced samples of the received signal are selectively attenuated and combined to form an output in which leading and lagging echoes of the desired signal are balanced against one another so that effectively only one output sample per transmitted symbol is obtained. In a paper entitled "A Simple Adaptive Equalizer for Efficient Data Transmission" (Institute of Electrical and Electronic Engineers Transactions on Communication Technology, Vol. Com-18, No. 1, pages 5 through 12, February 1970), D. Hirsch and W. J. Wolf summarize the state of the automatic equalizer art.

One problem in particular is common to adaptive systems, including transversal equalizers, regardless of their special purpose. This is the problem of accurately presetting the attenuators in the several subsystems to a desired set of initial values. Often the variable resistance of a field-effect transistor (FET) as described for example in the Hirsch et al paper in connection with the circuits diagrammed in FIGS. 8 and 9, provides the variable attenuation requirement. It is well known, however, that bipolar transistors, diodes, and photo and temperature sensitive resistors and other nonlinear devices can serve such a function. In many of these elements accurate presetting is difficult because of variations in tolerance between units.

Hirsch et al employ a bridge circuit including a precisely calibrated resistor and an FET with an associated integrator and a linearizing circuit. For zero presetting, a multistage comparator is required to achieve bridge balance. Due principally to the unpredictability of FET characteristics additional circuit elements are dedicated in each subsystem, i.e., tap control circuit, solely to the presetting function.

It is the principal object of this invention to simplify the attainment of a preset reference state in an adaptive control system.

It is a further object of this invention to establish predetermined initial tap gain coefficients in an automatic equalizer rapidly and accurately with a minimum of auxiliary equipment.

It is another object of this invention to reset the tap attenuators in an automatic equalizer or other adaptive control system to a predetermined initial state in response to an arbitrary input signal.

SUMMARY OF THE INVENTION

According to this invention, the above and other objects can be accomplished when the subsystem gain coefficients of an automatic adaptive control system are preset to a predetermined initial state responsive to an arbitrary input signal by applying the signal at a selected reference location alone to the error-determining comparator in place of the quantized overall output of the equalizer. Without any constraint on the gain coefficients the reference gain coefficient then stabilizes at unity gain and all other gain coefficients become substantially zero. This result follows regardless of the type of control system or adjustment algorithm employed.

In the illustrative embodiment an automatic transversal equalizer employing the modified zero-forcing algorithm described on page 7 of the Hirsch et al paper is improved by providing during start-up a direct connection from a principal delay-line tap to the reference input of a difference amplifier used as an error comparator.

Any signal that yields linearly independent components at the several subsystems or, in the case of the transversal filter, whose period is longer than the total delay thereof, can be used. A locally generated pseudorandom sequence, the received data signal or even noise is acceptable. Channel distortion and noise do not affect convergence or settling time, since any distortion or noise present occurs simultaneously in both the reference signal and the equalizer output.

In the event that experience indicates that nonzero lagging and leading tap values are more advantageous than zero values, fixed resistance values can be incorporated in the tap gain circuits to establish nonzero initial settings.

A feature of this invention is that presetting of an adaptive control system can be accomplished with the addition of a simple mechanical or electronic switch and a conductor from a principal reference location therein to the error comparator input.

DESCRIPTION

The above and other objects and features of this invention will be appreciated more fully from a consideration of the following detailed description and the single FIGURE of the drawing showing an automatic adaptive transversal equalizer modified in accordance with this invention.

DETAILED DESCRIPTION

The drawing illustrates a synchronous digital data transmission system incorporating an automatic adaptive transversal equalizer of the modified zero-forcing type improved in accordance with this invention for presetting the tap attenuator coefficients to a predetermined initial state independently of channel characteristics. A typical data transmission system comprises a data source 10, transmission channel 11 and data sink 20. Digital data originating at source 10 is to be transferred over channel 11 to sink 20 with minimum occurrence of error. The distortion characteristics of channel 11 are determinative of the feasible transmission rate that can be maintained by the system in the absence of equalization. With equalization it becomes possible to increase the transmission rate by several times while minimizing intersymbol interference. Transversal equalizer 12 is representative of an automatic adaptive equalizer of the type disclosed on page 7 of the above-mentioned Hirsch et al paper.

Transversal equalizer 12 in its unmodified state comprises first and second delay lines having respective analog delay units 13 and digital delay units 21, a plurality of adjustable attenuators 15 associated with individual taps such as C, D, and E on delay line 13, a plurality of correlators 19 associated with individual taps on delay line 21, a summing circuit 16 for combining the outputs of attenuators 15, a plurality of integrators 18 for averaging the individual outputs of correlators 19, a first slicer 14 for deriving the polarity of each received data symbol, a second signal slicer 24 for quantizing the signal output of summing circuit 16, a difference amplifier 25 for deriving an error signal from the difference between the actual output of summer 16 and the quantized decision output of slicer 24 and error polarity slicer 26 for furnishing a common error polarity signal to correlators 19. Only two each of delay units 13 and 21 with a total of three taps per delay line are shown for simplicity. In practice any number of taps can be used.

In operation the adaptive equalizer takes the summation (summer 16)

$$y_i = \sum_{j=-N}^{N} x_{i-j}c_j, \qquad (1)$$

(Where $i$ = order of sample, and $j$ = order of delay line tap)

of a plurality of consecutive received signal samples $x_i$ (at taps C, D, and E on delay line 13) as multiplied by tap attenuator coefficients $c_j$ (attenuators 15), slices (slicer 24), the summed signals at synchronous ($i$T, where T is the symbol interval) sampling instants to form the output signal polarity sgn $y_i$, subtracts $y_i$ from sgn ($y_i$) (difference amplifier 25) to obtain an error signal $e_i$, slices (slicer 26) the error signal $e_i$ at synchronous sampling instants ($i$T) to obtain its polarity sgn($e_i$) (leads 28), then forms the correlation (correlators 19) of sgn($e_i$) with each sgn($x_{i-j}$), and finally employs the last-mentioned correlations (through integrators 18) to adjust the attenuators incrementally in a direction tending to minimize the error $e_i$. A more detailed analysis is found in the Hirsch et al paper.

According to this invention, rapid presetting capability is achieved in such an adaptive equalizer by using the signal sample appearing at the principal reference tap of the equalizer as a standard against which the overall output is compared and from which the error signal is developed. In the drawing a direct connection is provided between the reference tap D (between delay units 13$_{-1}$ and 13$_{+1}$) by way of lead 22 and a single-pole double-throw switch 23 to the reference input of difference amplifier 25. When switch 23 is in position B, the normal modified zero-forcing algorithm is implemented. When switch 23 is in position A, however, the reference tap voltage becomes the equalization reference, and the tap attenuator coefficients are adjusted to make the signal at the output of summer 16 on lead 31 equal to the signal at the reference tap. The only way to obtain this result is for the reference tap coefficient to remain fixed at unity and all other tap coefficients to fall to zero. For the position B state tap gain coefficients become adaptive to transmitted data.

As an alternative to a zero setting of leading and lagging attenuators, any desired initial tap coefficients can be achieved (because the tap coefficients will be adjusted to match each other) by using fixed summing resistors in series between the tap outputs and the reference input of the difference amplifier. These summing resistors can be selected, for example, to realize a coarse average-channel adjustment. Under these conditions the variable attenuators will be brought to precisely the values of the fixed resistors and thus provide nonzero coefficients. In the drawing fixed attenuator 32 (shown in phantom between tap C and terminal A on switch 23) can be used to set variable attenuator 15$_{-1}$ to a nonzero value in this manner. Fine adjustment is then obtained from message data.

The presetting technique of this invention is also independent of the nature of the tap circuits, which may accordingly use various kinds of controllable analog or digital elements; as for example continuously variable field-effect transistors. In the latter case special-purpose feedback loops presently intended for zero resetting only are made unnecessary. Furthermore, the operation of switch 23 can be readily mechanized and made remotely controllable from transmitted signals using conventional means. Overall operation is also independent of the algorithm employed during the adaptive adjustment phase.

While this invention has been described in connection with the single illustrative embodiment of an adaptive equalizer, its principles are susceptible of much wider application as will be apparent to one skilled in the adaptive control art.

What is claimed is:

1. In an adaptive transversal equalizer control system including a plurality of selectively adjustable attenuators operating on a common input signal; combining means for weighted signals from all said attenuators; and means for generating an error signal for control of said attenuators from the difference between direct and normalized outputs of said combining means:

means for presetting said attenuators to a predetermined set of values comprising a direct connection established during each presetting operation for said common input signal to said error generating means in place of the normalized output of said combining means and means for applying an arbitrary test signal to the input of said system.

2. Presetting means as defined in claim 1 in which said predetermined set of values comprises a unity coefficient for one of said attenuators selected as a reference attenuator and zero coefficients for all other attenuators.

3. The adaptive control system of claim 1 in which an auxiliary fixed weighting element is provided for each attenuator requiring a nonzero value and said fixed weighting elements are joined at one end to said direct connection at said error generating means during presetting.

4. Presetting means as defined in claim 1 in combination with switching means providing connection in the alternative to said error-generating means from the normalized output of said combining means or from the input of a particular one of said attenuators selected as a reference attenuator.

5. The adaptive control system defined in claim 1 in which the several attenuators differ from each other by their frequency-domain signal shaping characteristics.

6. The adaptive control system defined in claim 1 in which the several attenuators are separated from each other by a plurality of time delay units.

7. In combination with an adaptive transversal equalizer having a plurality of signal taps separated from each other by discrete time-delay units, one of said taps being designated a reference tap; an adjustable attenuator at each of said taps; means for combining the weighted signals from said attenuators to form respective analog and quantized outputs; an error difference circuit normally having an inputs the respective outputs of said combining means and producing an output from which control signals for said attenuators are derived: the improvement providing rapid presetting of said attenuators to a reference state comprising a direct electrical connection established during presetting between said reference tap and the input of said error difference circuit to which the quantized output of said combining means is normally connected and in substitution therefor.

8. The combination of claim 7 and a fixed attenuator connectible during presetting between any tap at which a nonzero reference state is desired and the input of said error difference circuit.

* * * * *